June 13, 1950 W. A. MAGERKURTH ET AL Re. 23,240
APPARATUS FOR EXTRUDING THERMOPLASTIC MATERIALS
Original Filed Jan. 21, 1941 2 Sheets-Sheet 1
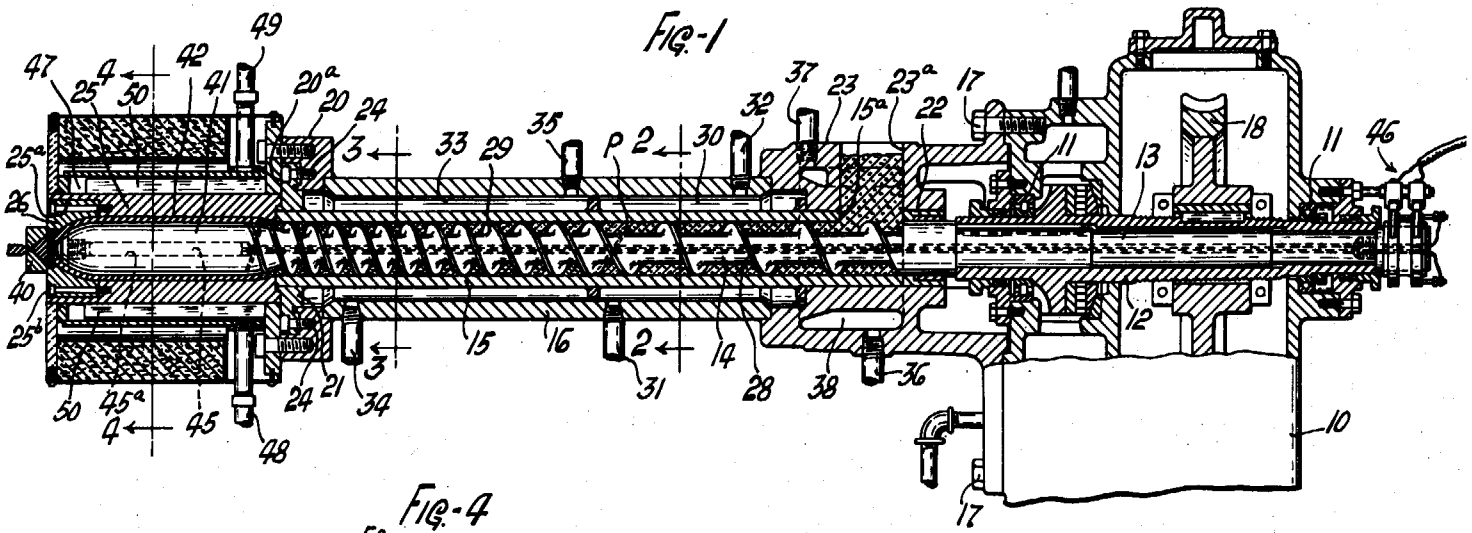
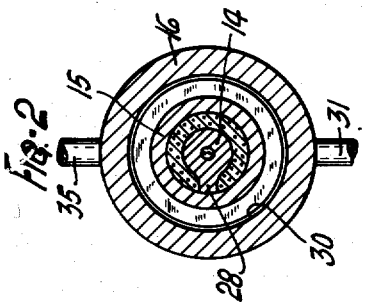
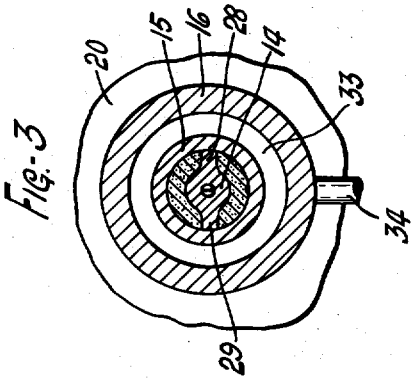
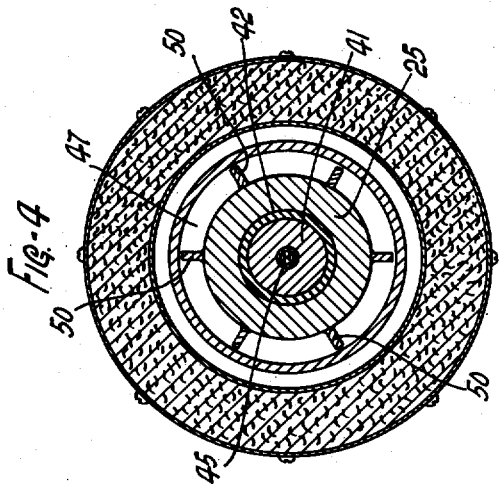
INVENTOR.
WILHELM A. MAGERKURTH
HANS E. BUECKEN
BY Ralph Barrow

APPARATUS FOR EXTRUDING THERMOPLASTIC MATERIALS

Original Filed Jan. 21, 1941 2 Sheets-Sheet 2

INVENTORS
WILHELM A. MAGERKURTH
HANS E. BUECKEN
BY J. Ralph Barrow

Reissued June 13, 1950

Re. 23,240

UNITED STATES PATENT OFFICE 23,240

APPARATUS FOR EXTRUDING THERMOPLASTIC MATERIALS

Wilhelm A. Magerkurth and Hans E. Buecken, Akron, Ohio, assignors to National Rubber Machinery Company, Akron, Ohio, a corporation of Ohio Original No. 2,407,503, dated September 10, 1946, Serial No. 375,124, January 21, 1941. Application for reissue October 19, 1949, Serial No. 122,341

5 Claims. (Cl. 18—12)

Matter enclosed in heavy brackets [ ] appears in the original patent but forms no part of this reissue specification; matter printed in italics indicates the additions made by reissue This invention relates to a method and apparatus for plasticizing and extruding powdered, granular, flaked, or like thermoplastic materials.

Heretofore, plasticizing and extruding machines having various types of extruding screws therein have been used, for example, in the rubber art, the extruding screws usually having had a single thread extending the length of the screw, and the screw threads having been designed in various ways for elimination of air bubbles from the plastic material and for the purpose of maintaining proper pressure at the extrusion head of the machine.

None of the known prior art extrusion devices, however, are entirely satisfactory for use in plasticizing thermoplastic materials, such as ethyl cellulose, vinyl chloride, vinyl acetate, cellulose acetate, cellulose acetate butyrate, cellulose nitrate, methyl methacrylate resins, and possibly many others, which when fed into the extruder are in powdered, granular, flaked form. One reason for this is that the physical characteristics of materials of the type enumerated are such that the plasticizing process tends to reduce the bulk of the material, sometimes to as much as one third of its original volume. Thus, there was a tendency for the agitation by the plasticizing screw to become less and less effective, with consequent proportionate reduction in the pressure toward the extrusion end of the screw. It has been found that the reducing of the effective screw pressure in this manner causes the material to be masticated too long, whereby it becomes overheated and discolored, the resulting extruded product frequently being semi-plastic, lumpy, or of non-uniform consistency because of the overtreated condition. Moreover, the stock issues from such devices in a pulsatory non-uniform manner causing variations in the cross-section of the issuing stock.

Because of certain characteristics of materials of the types mentioned above, it has been a practice in the past to form the same into articles by injection molding, which method, of course, has disadvantages and limitations.

An object of this invention is to provide a machine of the character described, including an improved plasticizing and extruding screw, by means of which desired pressure on the treated material will be maintained throughout the length of the screw, regardless of variations in the bulk of the material as it is plasticized from powdered or like form to a desired plastic condition, whereby the stock will be kept flowing uniformly to the extruding die and the resulting extruded product will be of uniform desired consistency and appearance.

Another object of the invention is to provide an improved apparatus for plasticizing and continuously extruding powdered, granular, flaky, or like thermoplastic material.

Another object of the invention is to provide apparatus of the character described having means for producing and uniformly maintaining the desired consistency of the plasticized thermoplastic material at a point just prior to its being forced through the extrusion die of the machine.

Still another object of the invention is to provide apparatus of the character described in which the screw is operable to plasticize the thermoplastic material without substantial pulsatory movement, whereby the material is extruded at a uniform rate of speed to produce continuous material of uniform cross-section.

A further object of the invention is to provide a device of the character described which can be readily cleaned.

These and other objects of the invention will be manifest from the following brief description and the accompanying drawings.

Of the accompanying drawings:

Figure 1 is a vertical cross-section, longitudinally of a machine embodying the invention.

Figure 2 is a cross-section taken on line 2—2 of Figure 1.

Figure 3 is a cross-section taken on line 3—3 of Figure 1.

Figure 4 is a cross-section taken on line 4—4 of Figure 1.

Figure 5:
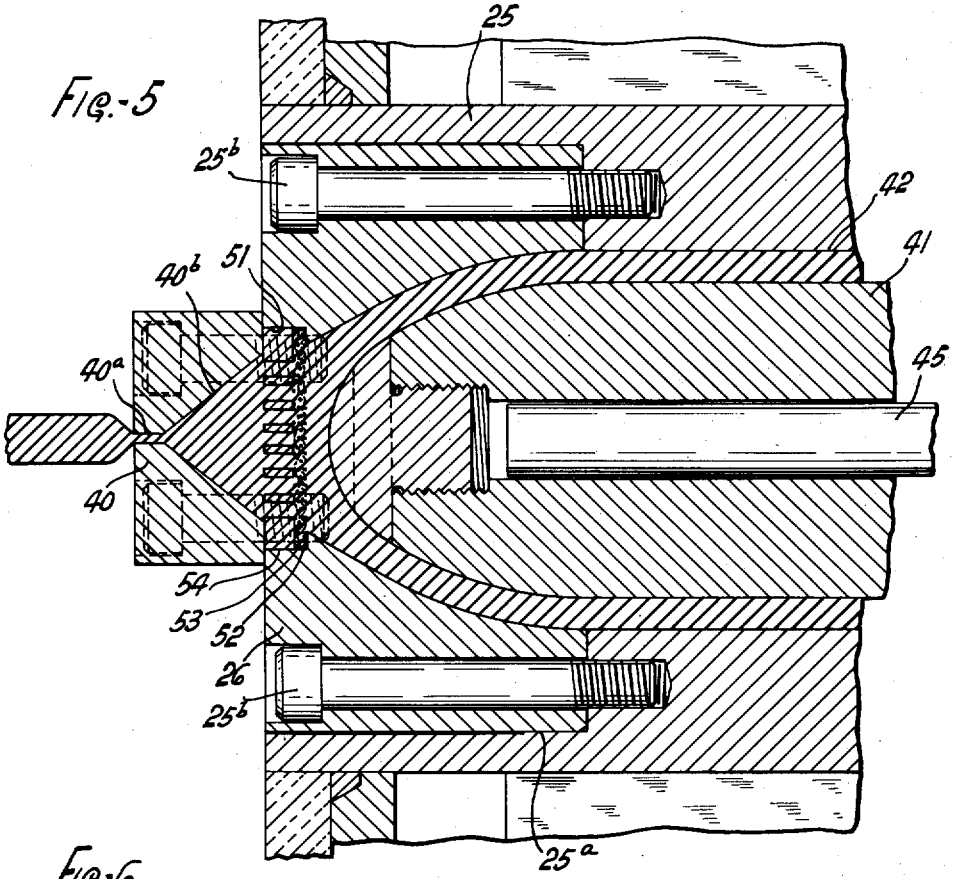
Figure 5 is a fragmentary cross-section, greatly enlarged, of the extrusion end of the machine as shown in Figure 1.

Referring in particular to Figures 1 to 5, inclusive, the numeral 10 designates a supporting housing, within which is suitably journalled at 11, 11 a sleeve 12 within which is keyed the shank 13 of a horizontally extending plasticizing and extruding screw shaft 14, said screw shaft being rotatable within a bushing 15 removably mounted in a casing 16 secured to the housing 10, as by bolts 17, 17. The screw shaft may be continuously rotated through a gear 18 keyed, within housing 10, on rotatable sleeve 12, by means of a suitable motor and reduction gearing (not shown).

For removably mounting bushing 15 in casing 16, an enlarged portion 20 on the outer end of the casing is counterbored to receive, flush with the outer face 20a thereof, an annular flange 21 on the outer end of the bushing, the inner end of said bushing being tightly received in a bore 22 in an enlarged portion 23 at the shank end of casing 16. The bushing is secured in place by means of countersunk screws 24, 24 as shown in Figure 1. An aperture 15a in bushing 15 communicates the shank end of the screw 14 with a feed hopper 23a in the enlarged portion 23 of casing 16.

Removably secured to the end face 20a of the enlarged portion 20 of casing 16 may be an extruder head 25, in the outer end of which a block 26 may be removably and replaceably secured within a recess 25a, as by means of screws 25b. Block 26 is adapted to be removed from head 25 to permit removal and cleaning of the screw shaft 14. By this construction either the entire head 25 or the block 26 may be removed to facilitate cleaning.

The screw shaft 14 may have a continuous thread 28 which extends from the hopper end of the shaft to approximately the end of cylinder or bushing 15, the pitch of this thread for about half its length, at the hopper end of the screw, being substantiall. uniform, and the remainder of the thread being of gradually diminishing pitch toward the extrusion or head end of the screw. Starting from a point P, half way along the length of the screw shaft, from the feed hopper end thereof or substantially at the point where the pitch of thread 28 starts to diminish, there may be a second thread 29 lying within or co-extensive with the remainder of said thread 28, and having correspondingly diminishing pitch. Thus, the screw shaft is so designed that granular, powdered, flaky, or like thermoplastic material of the types heretofore mentioned, may be fed through the hopper 23a to be first worked along the single-threaded portion of the screw, under the influence of a requisite degree of external heat for starting the breaking down or plasticizing process without the powdered material substantially adhering to the surfaces of the screw and cylinder. To this end, a chamber 30 in casing 16 surrounding a major portion of the single threaded portion of screw 14 may be suitably heated as by having hot oil, or other heated fluid, circulated therein, through piping 31, 32 from a suitable source of supply (not shown). An electrically heated jacket or other suitable electrical heating means may be used at this point.

As the material moving along the screw becomes more and more plasticized, its volume decreases proportionately, and hence the mass tends to remain too long in prior types of machines and to issue in a pulsatory manner. This, however, in the present machine, is prevented by the material entering the double threaded, diminishing pitched portion of the screw which increasingly confines the material to keep it moving forward under requisite pressure, the diminishing pitches of the threads 28 and 29 being such as to compensate for the decreasing volume of the material as it becomes completely plasticized toward the extrusion end of the screw. Proper plasticizing temperature may be maintained around the double threaded portion of the screw as by circulating hot fluid, such as hot oil or the like, within an annular chamber 33 in casing 16, such oil being supplied through piping 34, 35 from a suitable source of supply (not shown). An electrical heating element may be substituted here also.

In order to prevent the powdered or like thermoplastic material from becoming sticky in the hopper 23a and around the portion of the screw adjacent the same, which stickiness might hinder the plasticizing process, a cooling fluid, such as water from a suitable source (not shown), may be supplied, through piping 36, 37 to an annular chamber 38 in the enlarged portion 23 of casing 16 adjacent the hopper.

After the thermoplastic material has been plasticized, under the influence of heat and pressure, by means of the screw 14, it is finally subjected to uniform working under heat and pressure before extrusion of the material through a suitably apertured forming die.

To this end, a hollow extension 41 is provided on the extrusion end of screw shaft 14, to rotate therewith, this extension 41 projecting into a cavity 42 in the head 25. The diameter of extension 41 preferably is greater than the diameter of the hub of the screw 14, this enlarged extension being joined to the screw shaft by smoothly blended curves. The outer end of the extension is rounded and in spaced relation to the outer end of cavity 42. Cavity 42 may be the same shape as the extension, but larger in proportion to permit passage of a relatively thin uniform stream of plastic material from the end of the screw proper as compared with the stream as it leaves the extension end of the screw. The enlarged diameter of extension 41, compared with the diameter of the hub of screw 14, provides maximum surface areas for further uniform working and heating of the material, as will be described, the length of the extension, of course, also being an important factor in this connection. In other words the flow of plasticized material passing along the extension toward the extrusion orifice is relatively thin for the purposes described, but is substantially the same as the flow of the material as it passes from the extension end of the screw shaft so that the material will move smoothly toward said extrusion orifice. The revolving extension 41 has an additional advantage in that it is more readily cleaned than would be a fixed extension at this point which would require a supporting spider having arms extending across the path of the stock and fixed to or integral with the head 25. It will be seen that upon removal of head 25 extension 41 and cavity 42 both may be readily cleaned.

This additional working and heating of the plasticized material is necessary to make it of proper consistency for smooth continuous passage thereof through the forming aperture in the die 40. Heat may be supplied by a suitable electrical heating element 45 fixed within a cavity or bore 45a in the extension 41, as shown in Figures 1 and 5, said element being connected to a source of an electrical supply (not shown) through wiring extending through a bore in screw 14 and the shank 13 thereof and through a slip-ring device 46 of known type, and in addition, the head 25 may have therein an annular chamber 47 surrounding extension 41 within which hot oil is circulated, through piping 48, 49 connected to a source of supply. Baffles or vanes 50, 50 serve to facilitate uniform circulation of the heating fluid. Thus, the material passing through cavity 42 may be uniformly worked between the screw extension 41 and the inner surface of head 25 while thoroughly and effectively heated to the desired uniform plasticity for the purposes described. An electrical jacket or other suitable electrical heating means may be used instead of the circulating fluid heating means.

As best shown in Figure 5, the forming or extrusion orifice 40a of die 40 *is located beyond the end of the extension 41 and* may be enlarged inwardly at 40b toward chamber 42. Held within a recess 51 in block 26 by die 40, to be between enlarged aperture 40b and chamber 42, may be one or more relatively fine mesh screens 52, 53, and a perforate strainer plate 54, the meshes of the respective screens, preferably becoming increasingly coarse toward the plate. Plate 54 and the screens 52, 53 not only strain foreign matter from the extruded material but strain out any lumps therein so that these will be reworked between the extension 41 and the head 25 to the same degree of plasticity as the rest of the stock.

In the operation of the machine shown in Figures 1 to 5, inclusive, powdered, granular, flaky, or like thermoplastic material, of the types previously mentioned, is fed into hopper 23a at the shank end of screw 14. It may be said that there are three distinct zones in the apparatus described above. One zone is located along the single-threaded portion of screw 14, in which the material is mixed and broken down from powdered, granular, or flaky form to a partly plasticized mass. The second zone is along the double-threaded portion of the screw, in which zone the plasticizing process is completed, the double thread increasing the action on the material, and the diminishing pitch of the threads not only tending further to increase the pressure but also compensating for the ever decreasing volume or bulk of the material due to the breaking down process thereby maintaining uniform flow. The third zone is located in chamber 42, where the material is *not only* heated as desired to make it of requisite consistency or plasticity for extruding it through the die 40 *but in addition is uniformly worked. The material after thus being uniformly heated and worked is then converted from a relatively thin annular form to a desired compacted form in which latter condition the material issues from the extrusion orifice 40a. In this connection it is to be observed that the extension 41 terminates short of the extrusion orifice 40a whereby the material is not worked by relatively rotating surfaces at the time of extrusion, thus assuring a uniform extruded product.* It is understood that the temperatures in chamber 30, 33 and 50, adjacent the respective zones mentioned above, as well as the temperature of heating element 45, may be regulated as required to suit the particular material in use in the machine.

Figure 6:
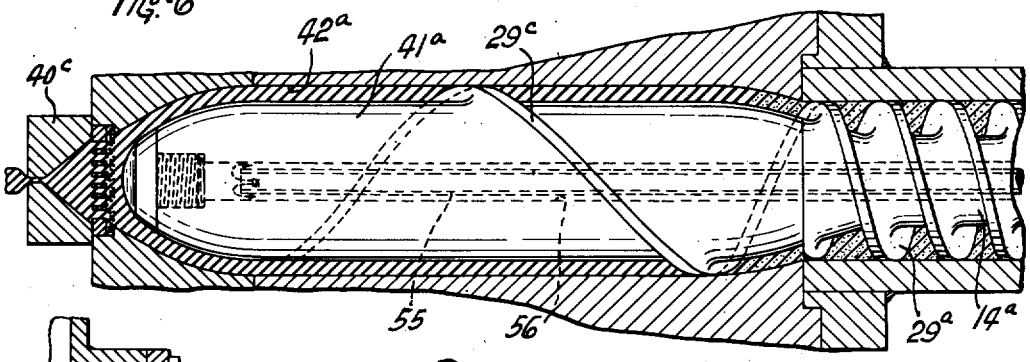
Figure 6 is an enlarged fragmentary, cross-sectional view of a modified form of construction at the extrusion end of the machine.
Figure 7:
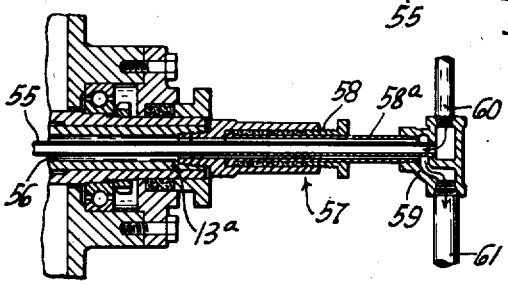
Figure 7 is a fragmentary cross-sectional view, on a reduced scale, taken at the other end of the machine shown in Figure 6, illustrating the inlet and outlet connections for supplying heated fluid to the interior of the plasticizing screw.

Figures 6 and 7 illustrate a modified form of the invention. This construction differs in one respect from the apparatus described in connection with Figures 1 to 5 in that one thread 29a of the double threaded screw 14a, similar to screw 14 previously described, extends around the extension 41a along a substantial straight portion thereof, the extended thread 29c engaging the inner surface of the cavity 42a into which extension 41 projects. The extended thread 29c preferably has a relatively large pitch for urging the material toward the extruding die 40c without unduly increasing the pressure thereon after it leaves the screw 14a. The thread extension or helical rib 29c, by engaging the surface of cavity 42a along a substantial portion of the length thereof, provides a bearing surface for the extension 41a to center the same and prevent whipping which might cause the extruded material to be non-uniform in cross-section.

For internally heating the enlarged extension 41a, a relatively fixed conduit 55 may be coaxially extended through a bore 56 extending from the outer end of shank 13a of screw shaft 14a (see Figure 6) and through the screw shaft, and substantially to the end of said enlarged extension thereon (Figure 6). As shown in Figure 7, there may be provided a device 57, of type commonly called a mill-T, including a packing sleeve or gland 58, secured in the end of shank 13a to rotate therewith, and a relatively fixed fitting 59 secured on the outer end of conduit 55. A sleeve 58a, co-axially mounted on conduit 55, is secured at one end to fitting 59 and is in fluid sealed connection with the rotatable packing gland 58 at the other end, to provide a passage from bore 56 to fitting 59 exteriorly of the conduit. Heating fluid, such as hot oil from a suitable source (not shown) may be circulated, through a pipe 60 connecting fitting 59, and through conduit to the other end thereof, where the fluid is returned on the outside of the conduit, and through the passage between conduit 55 and sleeve 58a, fitting 59, and a return pipe 61, to said source of supply. This arrangement is such that hot oil, flowing from the extrusion end of conduit 55 will be hottest where most desirable, in the region of the enlarged extension, the effective temperature of the oil gradually decreasing along the screw shaft 14a toward the shank thereof. The temperatures in the regions of the different zones may be controlled, however, by varying the externally supplied heat as described in connection with Figures 1 to 5.

By means of the forms of the invention described above, it is possible uniformly to extrude plastics of the types previously mentioned, for example, into continuous strip materials having desired cross-sectional shape, for numerous purposes, and in certain instances to make finished products which, heretofore, have not been thought possible or practical.

Modifications of the invention may be resorted to without departing from the spirit thereof, or the scope of the appended claims.

What is claimed is:

1. A machine for plasticizing and extruding thermoplastic materials of the character described, comprising a casing having a bore therein, [and] a screw shaft rotatable in said bore, said screw shaft having a hub with a feeding rib extending outwardly therefrom, said casing having a cavity communicating with said bore at the extrusion end of the machine, *and a die at one end of said casing formed with an extrusion orifice communicating with such cavity,* said shaft having a substantially cylindrical extension projecting into said cavity *but terminating short of the extrusion orifice in said die,* said extension being rotatable with said shaft, the diameter of the extension being greater than that of said hub, the surface of said extension being in closely and uniformly spaced relation to the surface of said cavity, said extension having a helical rib thereon projecting outwardly therefrom and engaging the surface of said cavity.

2. A machine for plasticizing and extruding thermoplastic materials of the character described, comprising a casing having a bore therein, a screw shaft rotatable in said bore, said screw shaft having a hub with a feeding rib extending outwardly therefrom, said casing having a cavity communicating with said bore at the extrusion end of the machine, *a die at one end of said casing formed with an extrusion orifice communicating with such cavity*, said shaft having a substantially cylindrical extension projecting into said cavity *but terminating short of the extrusion orifice in said die*, said extension being rotatable with said shaft, the diameter of the extension being greater than that of said hub, the surface of said extension being in closely and uniformly spaced relation to the surface of said cavity, and means on said extension movable with the surface thereof for urging forwardly plasticized material received from said screw, and means for heating said material as it is urged over the surface of said extension.

3. A machine for plasticizing and extruding thermoplastic materials of the character described, comprising a casing having a bore therein, a screw shaft rotatable in said bore, said screw shaft having a hub provided with a feeding rib extending outwardly therefrom, a head on said casing having an extrusion orifice at an extrusion end of the casing and having an extension cavity communicating said bore with said extrusion orifice, said shaft having an elongated substantially cylindrical extension thereon projecting into said cavity *but terminating short of the extrusion orifice*, said extension being rotatable with said shaft, said extension being of greater diameter than said hub of the screw shaft and being of such diameter with respect to the diameter of said cavity that the flow of plasticized material passing along the extension toward said extrusion orifice will be relatively thin but substantially the same as the flow of the material as it passes from the extension end of the screw shaft.

4. A machine for plasticizing and extruding thermoplastic materials of the character described, comprising a casing having a bore therein, a plasticizing screw shaft rotatable in said bore, said screw shaft having a hub provided with a feeding rib extending outwardly therefrom, a head on said casing having an extrusion orifice at an extrusion end of the casing and having an extension cavity communicating said bore with said extrusion orifice, said screw having thereon an elongated substantially cylindrical extension projecting into said cavity *but terminating short of the extrusion orifice*, said extension being rotatable with said shaft, said extension being of greater diameter than said hub of the screw shaft and being of such diameter with respect to the diameter of said cavity that the flow of plasticized material passing along the extension toward said extrusion orifice will be relatively thin but substantially the same as the flow of the material as it passes from the extension end of the screw shaft.

5. A machine for plasticizing and extruding thermoplastic materials of the character described, comprising a casing having a bore and an extension cavity in communication with said bore at an extrusion end of the casing, said casing having an extrusion orifice at the extrusion end thereof communicating with said cavity, and a screw shaft rotatable in said bore and having a hub, said shaft having a continuous thread extending substantially the length thereof outwardly of said hub, a substantial portion of said thread adjacent said cavity being of diminishing pitch, said shaft having a second thread also outwardly of said hub and coextensive with a substantial proportion of the length of said first named thread at the end of the shaft adjacent said cavity, said screw shaft having an extension end and an elongated extension projecting into said cavity *but terminating short of the extrusion orifice*, said extension being rotatable with the screw shaft, said extension being of greater diameter than said hub of the screw shaft and being of such diameter with respect to the diameter of said cavity that the flow of plasticized material passing along the extension toward said extrusion orifice will be relatively thin but substantially the same as the flow of the material as it passes from the extension end of the screw shaft.

WILHELM A. MAGERKURTH.
HANS E. BUECKEN.

REFERENCES CITED

The following references are of record in the file of this patent or the original patent:

UNITED STATES PATENTS

| Number | Name | Date |
|---|---|---|
| 1,445,724 | Skorkorsky | Feb. 20, 1923 |
| 1,608,980 | Gordon | Nov. 30, 1926 |
| 1,902,295 | Shook | Mar. 21, 1933 |
| 1,904,884 | Royle | Apr. 18, 1933 |
| 1,935,050 | Gordon | Nov. 14, 1933 |
| 1,959,628 | Jacobson | May 22, 1934 |
| 2,177,633 | Blackard | Oct. 31, 1939 |
| 2,177,658 | Kimble, et al. | Oct. 31, 1939 |
| 2,286,405 | Gordon | June 16, 1942 |